United States Patent [19]

Enzmann

[11] 4,001,118
[45] Jan. 4, 1977

[54] APPARATUS FOR SEPARATING FOREIGN SOLID PARTICLES FROM A LIQUID

[76] Inventor: Siegmund J. Enzmann, 4534 Leslie Ann Lane, Racine, Wis. 53403

[22] Filed: Aug. 11, 1975

[21] Appl. No.: 603,634

[52] U.S. Cl. .......................... 210/187; 210/195 R; 210/223; 210/320; 210/522; 210/540
[51] Int. Cl.² ................. B01D 35/18; B01D 21/26; B01D 29/00
[58] Field of Search .................. 210/21, 22, 71, 73, 210/84, 194, 195, 197, 187, 167, 109, 511, 519, 513, 515, 538, 539, 540, 512, 222, 223, 260, 320, 522

[56] References Cited
UNITED STATES PATENTS

| 477,061 | 6/1892 | Noppel | 210/511 |
|---|---|---|---|
| 1,545,979 | 7/1925 | Rosenberg | 210/540 X |
| 2,284,737 | 6/1942 | Hirshstein | 210/540 X |
| 2,585,878 | 2/1952 | Tryon | 210/540 |
| 2,813,074 | 11/1957 | Banks et al. | 210/525 X |
| 2,831,579 | 4/1958 | Gehle | 210/540 X |
| 2,901,108 | 8/1959 | Spodig | 210/222 UX |
| 3,300,053 | 1/1967 | Peters | 210/540 X |
| 3,320,161 | 5/1967 | Lapaix | 210/83 |
| 3,540,588 | 11/1970 | Estabrook | 210/84 |
| 3,661,774 | 5/1972 | Masologites | 210/21 |
| 3,894,949 | 7/1975 | Enzmann | 210/540 |
| 3,931,008 | 1/1976 | Page et al. | 210/202 |

*Primary Examiner*—Theodore A. Granger
*Attorney, Agent, or Firm*—Arthur J. Hansmann

[57] ABSTRACT

Apparatus for separating foreign solid particles from a liquid with the apparatus including a tank having a liquid inlet and outlet for the contaminated liquid, and the tank having a liquid inlet and outlet for a flushing liquid, and with the apparatus including a hydro-cyclotron and liquid pumps for moving the liquids.

16 Claims, 3 Drawing Figures

APPARATUS FOR SEPARATING FOREIGN SOLID PARTICLES FROM A LIQUID

This invention relates to apparatus for separating foreign solid particles from a liquid, and, more particularly, it pertains to the treatment of a liquid having foreign solid particles therein, such as a coolant or like liquid utilized in industrial plants during machining and wherein it is desired to remove the foreign particles from the coolant for reuse.

BACKGROUND OF THE INVENTION

The prior art is already aware of apparatus and methods useful in the handling and treatment of liquids for removing suspended particles or contamination from a liquid, and this includes apparatus and methods which operate on the principle of a settling tank or the like wherein there may be various compartments for receiving and processing the liquid and the tank can include baffles and inlets and outlets for the guidance of the flow of the liquid through the tank. Also, examples of prior art apparatus and methods are found in U.S. Pat. Nos. 2,284,737 and 2,585,878 and 2,955,714 and 3,341,983 and 3,540,588 and 3,731,802. Also, simply by way of reference to additional disclosures, my own U.S. Pat. No. 3,894,949 discloses apparatus for separating liquids from a liquid mixture and utilizing a tank.

The present invention is distinguishable from the aforesaid disclosures in that it is relating to apparatus and a method for separating solid particles from a liquid, such as the coolant used in machining, or other liquids found or utilized in other circumstances. That is, as related to the machining problem, it is common practice to have a liquid coolant applied to a work piece which is being machined, and the coolant will of course pick up metal chips and other solid particles, and it is desirable to remove the particles from the coolant so that the coolant can be recovered and even reused in a non-contaminated or cleaner form which does not have the particles mentioned. Still further, the type of coolant commonly used in the machining industry is an oil base type, and the coolant will normally come into contact with oil from the machine or the work piece or any other source, and it might also pick up water, and it is then desirable to separate the water from the oil or oils mentioned.

The present invention provides apparatus and a method for accomplishing the aforementioned and overcoming the problems mentioned above, all as pertaining to the prior art. Therefore, the apparatus and method of this invention has the objective of separating solid particles from a liquid, and it also has the effect of separating two different weight liquids from a liquid mixture which is also the liquid with the particle contaminants mentioned.

Another object and advantage of this invention is to provide the apparatus and method mentioned above, which is for the purposes and functions mentioned above, and to do so with apparatus which is of a minimum of complexity and expense and effecting the optimum efficiency of separating solid particles from a liquid, and to further subject the particles to a treatment which further removes them from the apparatus and the vehicle or supportive liquid utilized.

Other objects and advantages will become aparent upon reading the following description in light of the accompanying drawings.

DETAILED DESCRIPTION OF THE PREFERRED EMBODIMENT AND METHOD

The following description refers to the drawings which disclose the apparatus, and it will also be seen and understood by one of ordinary skill in the art that the method invention is disclosed by reference to and study of the drawings, as well as having the method disclosed by the hereinafter incorporated description of the method itself. Still further, reference made to my corresponding U.S. Pat. No. 3,894,949 which shows apparatus and which describes the function and use of the apparatus for the purpose of separating liquids from a liquid mixture, and, to the extent necessary or desirable, reference to that patent may be useful in the background and understanding of the present description.

The drawings show a tank 10 having a bottom 11 and upright side walls 12 and 13 with the walls 12 being described as being on opposite ends of the tank 10. The bottom 11 is shown to be slanted toward a center line 15, for a purpose hereinafter mentioned. Of course the entire tank is made liquid tight for receiving and supporting and containing the liquids hereinafter described.

Figures 2, 3:
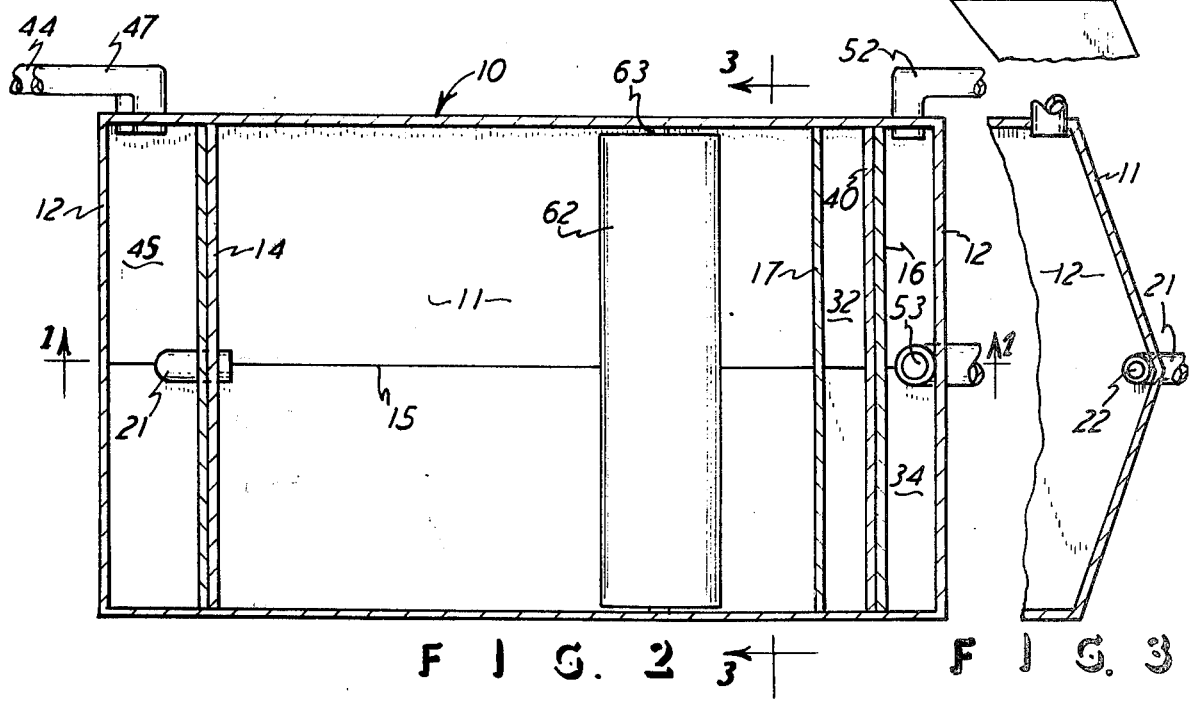
FIG. 2 is a sectional view taken along the line 2—2 of FIG. 1.
FIG. 3 is a sectional view of a fragment of the apparatus, taken along the line 3—3 of FIG. 2.

The tank also has uprightly disposed partitions or walls 14 and 16 which are liquid tight with the tank bottom 11, and it has an uprightly disposed wall or partition 17 which is spaced from the bottom 11 at the location designated 18. Further, the tank is shown to have a cover or top 19 which is liquid tight between the side walls 13 and the interior partitions or walls 14 and 17. The partitions 14 and 16 and 17 extend across the tank and are shown to be in contact with and are liquid tight with the two opposite side walls 13, as seen in FIG. 2.

Figure 1:
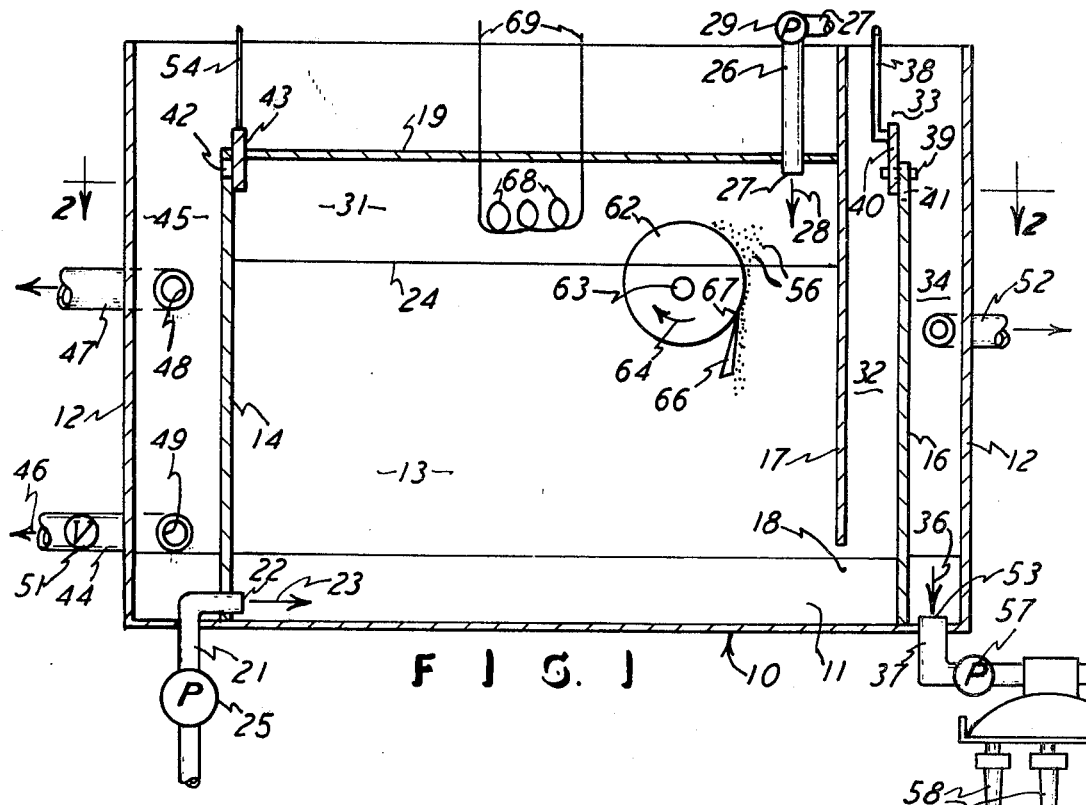
FIG. 1 is a sectional view through an embodiment of apparatus of this invention, and with the view being taken generally along the line 1—1 of FIG. 2.

In the method of this invention, a vehicle liquid is introduced into the tank 10 through the liquid pipe or conduit 21 which extends fluid tightly into the tank 10 and has an outlet 22 at its terminal end thereof for introducing a jet of the vehicle liquid into the tank, as shown by the arrow designated 23 in FIG. 1. A liquid pump 25 is connected with the pipe 21 for moving the vehicle liquid into the tank 10 and creating the stream or jet of the liquid, as shown by the arrow 23. The vehicle liquid may be introduced into the tank and achieve an upper level designated by the line 24. Also, the contaminated liquid, that is the liquid with the solid particles and any water, is introduced into the tank through the pipe or conduit 26 which extends through the top 19 and has an outlet 27 at the terminal end of the pipe 26 for introducing the contaminated liquid into the tank, as shown by the arrow designated 28. Also, a liquid pump 29 is shown connected with the pipe 26 for pumping the contaminated liquid into the tank 10, and the pipe 26 has its portion 27 extending from a machine tool location, or any other source which would receive the contaminated liquid and direct it to the tank 10, as indicated. The contaminated liquid is commonly a machine tool coolant of a lower specific gravity than that of the vehicle liquid which may be water entering at the tank inlet which is the opening then designated 22. Likewise, the opening designated 27 is then the inlet for the contaminated liquid relative to the tank 10. The contaminated liquid may then form a layer 31 on the top of the vehicle liquid and thus be the layer designated above the line 24 and can extend up to the top 19.

With the upper surface of the total of the vehicle liquid and the contaminated liquid being adjacent the top 19, in the arrangement shown in FIG. 1, then the vehicle liquid will of course pass through the opening 18 and rise in the conduit or passageway designated 32 and will flow out of the tank through an outlet or overflow point designated 33, and the vehicle liquid will continue to flow out of the tank by moving into the passageway or compartment 34 and flow in the direction of the arrow indicated 36 and enter a pipe or conduit 37 connected with the tank 10 and thus the vehicle liquid will move out of the tank 10. An adjustable wall or baffle 40 is shown vertically slidably adjustable on the partition 16 to adjustably position the height of the overflow or outlet designated 33, and this adjustment may be made according to the desired level of the upper surface of the total of the two liquids in the central portion of the tank, as mentioned. A control arm 38 may be connected to the adjustable baffle 40 for setting the elevation or the baffle 40 and thus controlling the vertical location and height of the outlet 33. A pin 39 is shown slidable in a slot 41 on the upper end of the partition 16, to indicate one arrangement for slidably mounting the baffle 40 on the upper end of the partition 16.

The upper end of the partition or wall 14 is shown to have a liquid outlet 42 which, by means of a valve or adjustable baffle 43, the outlet opening 42 is available to the contaminated liquid which can thus flow out the opening 42 and into the compartment or passageway 45. The liquid designated in the layer 31 is no longer at least completely contaminated when it moves through the opening 42, for reasons hereinafter mentioned, and this is therefore then the treated liquid which can flow through a pipe or conduit 44 which is connected to the tank 10 to permit the treated liquid to exhaust from the tank 10, as indicated by the arrow designated 46. Also, another pipe or conduit 47 is connected to the tank 10 and has an opening 48 extending in flow communication with the compartment 45, just as the pipe 44 has an opening 49 extending into flow communication with the compartment 45, and the treated liquid can then actually rise in the compartment 45 since it is under the influence of a valve 51 controlling the quantity of flow through the pipe 44, and thus any lightweight oil or the like, as compared to the weight and specific gravity of the remainder of the treated liquid in the compartment 45, can rise to the upper surface of the liquid mixture in the compartment 45 and thus the lighter weight and lower specific gravity liquid will flow out of the compartment 45 through the pipe 47 and thereby permit the separation of the heavier specific gravity liquid and the lighter specific gravity liquid of the mixture in the compartment 45 so that they respectively move out of the tank through the pipes 44 and 47.

In a similar manner for separating the lower and higher specific gravity liquids that may exist in the vehicle liquid in the passageway or compartment 34, the lower specific gravity liquid may flow from the compartment 34 through a pipe 52 which is connected with the compartment 34 at an elevation above the final tank outlet designated 53 at the end of the pipe 37. That is, the flow through the pipe 37 can actually be controlled, such as by a conventional, but unshown, valve in pipe 37 and like the valve 51 in pipe 44, so that the liquid could rise in the compartment 34 and have the lighter weight liquid flow out the pipe 52 to further separate the two different weights of liquid which may exist in the liquid mixture in the compartment 34.

With regard to controlling the flow of liquids through the tank, it will therefore be seen and understood that the vehicle liquid and the contaminated liquid each have a liquid inlet and a liquid outlet relative to the tank 10. It will also be understood that the liquid inlet for the vehicle liquid can be brought in to the tank 10 under a pressure and jet, and this may be 10 or 20 psi. Also, the tank has the liquid conduit 32 which has the liquid entranceway designated 18 and the liquid exitway designated 33, and the entranceway 18 is of course adjacent the tank bottom 11 and the exitway 33 is disposed at an elevation above the liquid entrance 18. Also, the contaminated liquid has its liquid inlet 27 and its outlet 42, and the valve or baffle 43 permits control over the formation of the depth of the contaminated liquid layer designated 31 and of course it permits control over the exhaust or outlet flow of the liquid layer 31 from the tank. That is, if the valve 43 is closed while the contaminated liquid is entering the tank 10, then the layer partition line 24 would move downwardly, from say the position shown in FIG. 1, while the incoming vehicle liquid would still continue to flow out of the tank, as described, and this gives control over the depth of the layer 31, and a control arm 54 is shown on the valve or baffle 43, for control as mentioned.

The manner in which the contaminated liquid in the layer 31 is treated is that it is recognized that the contaminated liquid has solid particles, such as metal chips designated 56, and these chips are in suspension in the contaminated liquid which enters the tank 10. With the contaminated liquid being disposed in its layer 31, the chips will sink in the layer 31 and will sink into the vehicle liquid which is below the partition line 24. Thus, the solid particles and like contamination designated 56 will sink into the vehicle liquid and will be flushed from the tank through the stream action and flow of the vehicle liquid from the tank 10, in the manner described above. That is, the vehicle liquid has sufficient stream velocity and is of sufficient nature to carry and flush the contaminated particles 56 along with it and to the outlets and into the pipe 37, and the vehicle liquid may be water which of course has a specific gravity of one and is therefore the heavier of the two liquids compared to the lesser specific gravity for the oil or coolant in the layer 31.

The vehicle liquid with the contaminants thus enters the pipe 37, and it may be under the influence of a liquid pump 57 which can be slowly operated to create the overflow for pipe 52 and which directs the vehicle liquid to hydro-cyclotrons 58 which, in a conventional construction and manner, treat the vehicle liquid and separate the solid particles or contaminants 56 and dispose them into an outlet designated 59 and the now cleaner vehicle liquid will move from the hydro-cyclotrons 58 and and into a pipe, such as the pipe 61 which can be connected with the pipe 21 to recycle the vehicle liquid to the tank 10. The actual arrangement and construction for the piping and the hydro-cyclotrons 58 is conventional and is as disclosed in my U.S. Pat. No. 3,894,949, and it may also be arranged as shown with the hydro-cyclotron disclosed in U.S. Pat. No. 3,341,983.

Therefore, the contaminated liquid forming the layer 31 enters the tank 10 through the inlet 27 which is spaced an optimum spacing from the outlet 42, and thus the inlet 27 and outlet 42 are at opposite sides of the tank 10 so that the sinking of the particles 56 from the layer 31 will be of a maximum quantity and efficiency since maximum time is provided for the movement of the liquid layer 31 from its inlet 27 to its outlet 42.

To further enhance the removal of the particles from the layer 31, a magnet, shown to be in the form of a drum 62, is rotatably mounted in the tank 10 by means of the trunnions 63, and the drum 62 can rotate in the direction of the arrow designated 64. Thus, the magnet or drum 62 will attract the metal particles 56 and cause them to collect, as indicated in FIG. 1, and a scraper or ductor blade 66 is disposed adjacent the drum 62 to contact the drum at the location designated 67 and thus scrape the particles 56 from the magnet 62 and cause the particles to sink into the vehicle liquid, as indicated. Thus, the drum 62 is shown to be submerged in the liquid mixture in the tank so that it extends into both the liquids defined on opposite sides of the layer line 24.

Still further, to enhance the sinking of the particles 56 from the layer 31, a heater, shown in the form of a heating electric coil 68, is immersed in the layer 31 and it has its connecting wire 69 extending from the tank 10 for purposes of conventional electric powering of the heater coil 68 and thereby heat the contaminated liquid in the layer 31 to promote the sinking of the particles 56 from the layer 31 by reducing the viscosity of the contaminated liquid, and the reduction is achieved by the increase in temperature of the contaminated liquid.

By means of the forgoing description, with reference to the accompanying drawings, both the apparatus and method are described so that one skilled in the art can fully understand the construction of the apparatus and the method steps. Of course the contaminants or particles 56 which are magnetically attracted would be the ones attracted to the magnet 62, and both the apparatus and method are effective for the dual function of removing the solid particles from the contaminated liquid and for also separating the water or the like from the processed contaminated liquid which flows into the compartment designated 45, all as described above. The vehicle liquid is introduced into the tank under a liquid pressure, as mentioned, and this pressure is commonly available from the hydro-cyclotron apparatus shown and described. Also, the slanted tank bottom 11 will cause the solid particles 56 to accumulate or move to the lowest point of the bottom, as designated along the line 15, and thus the vehicle liquid inlet 22 can be positioned at that line and therefore have maximum efficiency in flushing the vehicle liquid from the bottom of the tank 10 and into the entranceway 18 which is located adjacent the slanted bottom 11. Since the elevation and lowering of the baffle 40 determines the elevated location of the outlet 33, the adjustment of the baffle 40 also determines the overflow of the contaminated liquid in the upper layer 31 and through its outlet 42. In this arrangement, the elevation of the baffle 40 and also the control or the baffle or valve 43 will control the flow through the outlet 42 and can thereby establish and control and alter the depth of the layer 31.

What is claimed is:

1. Apparatus for separating foreign solid particles from a liquid comprising a tank having a bottom and side walls for receiving liquid, said tank having a liquid inlet and a liquid outlet for a light-weight liquid and spaced apart from each other to be respectively adjacent said side walls and disposed above the elevation of said bottom for the flow of the light-weight liquid into and out of said tank, said tank having a liquid inlet for a heavy liquid and disposed adjacent said bottom for introducing the heavy liquid into said tank and presenting the heavy liquid in a layer underneath the light-weight liquid and providing a vehicle for moving the foreign solid particles which sink from the light-weight liquid, and said tank having a liquid conduit with a liquid entrance-way disposed adjacent said bottom and a liquid exit-way disposed at an elevation above that of said liquid entrance-way, said liquid entrance-way and said liquid inlet for said heavy liquid being spaced apart with respective ones thereof adjacent opposite ones of said side walls for the flow of the particle-laden heavy liquid out of said tank, a liquid-flow connector connected with said tank in liquid-flow communication with said liquid conduit exit-way for receiving the heavy fluid therefrom, and a hydro-cyclotron connected with said connector in liquid-flow communication with said liquid conduit for receiving the particle-laden heavy liquid and separating the particles therefrom.

2. The apparatus for separating foreign solid particles from a liquid as claimed in claim 1, including a liquid flow pipe connected between said hydro-cyclotron and said liquid inlet for the heavy liquid, for directing the heavy liquid to return to said tank.

3. The apparatus for separating foreign solid particles from a liquid as claimed in claim 2, including a liquid pump operatively connected between said liquid conduit and said hydro-cyclotron for the forced flow of the heavy liquid from said tank to said hydro-cyclotron.

4. The apparatus for separating foreign solid particles from a liquid as claimed in claim 1, including a liquid pump operatively connected with said liquid inlet for the heavy liquid, for introducing the heavy liquid into said tank under a liquid pressure.

5. The apparatus for separating foreign solid particles from a liquid as claimed in claim 1, wherein said liquid conduit extends uprightly between said liquid entrance-way and said liquid exit-way with the latter being located at an elevation at least as high as that of said liquid outlet to cause the light-weight liquid to rise to the elevation of said liquid outlet.

6. The apparatus for separating foreign solid particles from a liquid as claimed in claim 1, including an adjustable partition movably disposed on said conduit at said exit-way and arranged for adjusting the elevation of said exit-way.

7. The apparatus for separating foreign solid particles from a liquid as claimed in claim 1, including a top on said tank enclosing said tank above the light-weight liquid and thereby limiting the rise of the light-weight liquid in said tank, and a valve fluid-flow connected with said tank for controlling the flow of the light-weight liquid out of said tank.

8. The apparatus for separating foreign solid particles from a liquid as claimed in claim 1, including a liquid outlet chamber in liquid-flow communication with said liquid outlet, two vertically spaced-apart openings in liquid-flow communication with said chamber for the flow of liquid from said chamber, and a valve operative on the lower one of said two vertically spaced-apart openings for controlling the flow of the liquid through said openings.

9. The apparatus for separating foreign solid particles from a liquid as claimed in claim 1, including a heater member applied to the light-weight liquid for lowering the viscosity of the light-weight liquid and thereby facilitating the sinking of the solid foreign particles from the light-weight liquid.

10. The apparatus for separating foreign solid particles from a liquid as claimed in claim 1, including a magnet disposed in the light-weight liquid for attracting the solid foreign particles thereto and direct them to the heavy liquid.

11. The apparatus for separating foreign solid particles from a liquid as claimed in claim 10, wherein said magnet is submersed in both the liquids.

12. The apparatus for separating foreign solid particles from a liquid as claimed in claim 11, wherein said magnet is movably mounted for carrying the solid foreign particles from the light-weight liquid to the heavy liquid.

13. The apparatus for separating foreign solid particles from a liquid as claimed in claim 12, wherein said magnet is a rotatably mounted drum having its rotation axis horizontally disposed.

14. The apparatus for separating foreign solid particles from a liquid as claimed in claim 13, including a scraper in contact with said drum for removing the solid foreign particles from said drum.

15. The apparatus for separating foreign solid particles from a liquid as claimed in claim 1, including a liquid compartment in liquid-flow communication with said liquid exit-way, two vertically spaced-apart liquid outlet members in liquid-flow communication with said compartment for the flow of liquid from said compartment, and a flow control member operative on the lower one of said two vertically spaced-apart liquid outlet members for controlling the flow of the liquid through said outlet members.

16. Means for separating foreign solid particles from a liquid, comprising tank means for receiving two liquids of different specific gravities, two sets of liquid-flow means in liquid-flow communication with said tank means for separate and respective entrance and exit of the two liquids relative to said tank means, both of said liquid flow means having liquid inlets and liquid outlets relative to said tank means and respectively on opposite sides of said tank means for the entrance and exit of the two liquids relative to said tank means and for the flow across said tank means, both said liquid outlets being located in elevated positions on said tank means to effect overflow exit of the said liquids from said tank means, one of said liquid inlets being for the lesser specific gravity liquid and being located in an elevated position on said tank means and with the other of said liquid inlets being for the greater specific gravity liquid and being located in a position lower than said elevated position, pump means connected with said other of said liquid inlets for pumping the greater specific gravity liquid into said tank means beneath the lesser specific gravity liquid for flushing across the bottom of said tank means, a liquid-flow connector connected with said tank means in liquid-flow communication with said liquid outlet for the greater specific gravity liquid, and a hydro-cyclotron connected with said connector to be in liquid-flow communication therewith for the greater specific gravity liquid for receiving the particle-laden latter said liquid and separating the particles therefrom.

* * * * *